C. E. MARTIN & S. J. CLOKEY.
WHEEL.
APPLICATION FILED FEB. 10, 1911.
1,021,467.
Patented Mar. 26, 1912.
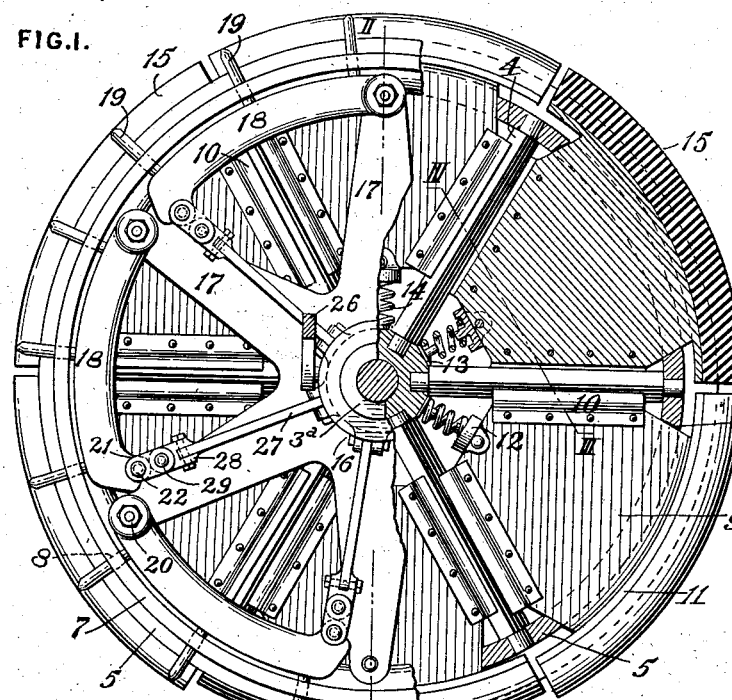

UNITED STATES PATENT OFFICE.

CHARLES E. MARTIN AND SAMUEL J. CLOKEY, OF WASHINGTON, PENNSYLVANIA.

WHEEL.

1,021,467.  Specification of Letters Patent.  Patented Mar. 26, 1912.

Application filed February 10, 1911. Serial No. 607,752.

*To all whom it may concern:*

Be it known that we, CHARLES E. MARTIN and SAMUEL J. CLOKEY, both of Washington, in the county of Washington and State of Pennsylvania, have invented certain new and useful Improvements in Wheels, of which the following is a specification.

An object of our invention is to provide a new and improved resilient wheel particularly designed for motor vehicles, and adapted to take the place of the usual motor vehicle wheel employing a pneumatic tire.

In the accompanying drawing, which illustrates an application of our invention, Figure 1 is a part elevational view and a part sectional view of a wheel embodying our invention; Fig. 2, a central vertical sectional view taken on line II—II of Fig. 1; Fig. 3, a detail sectional view taken on line III—III of Fig. 1; and Fig. 4, a view similar to Fig. 3 showing a modified form.

The wheel constituting our invention and as illustrated and as preferred, comprises a hub 3, a series of spokes 4, and a rim or felly 5. Rim 5 is preferably of U-shape in cross-section, and comprises a continuous, metallic structure, formed with a series of slots or openings 6 therein. Formed integral with said rim, or securely attached thereto by some suitable means, is an annular flange 7. This flange is disposed on one side of the rim, and is formed with a series of openings 8.

Interposed between the spokes 4, we provide a series of tire-supporting members 9, each having a portion thereof located in and adapted to move radially in a slot 6 of the rim 5. Each of the members 9 is provided with guides 10 adapted to engage the adjacent spokes of the wheel for the purpose of guiding the supporting-members during their limited radial movement; and said members, in addition to the guides 10, are each provided with a circumferentially disposed flange 11 adapted to move in the rim 5. Secured to the inner end of each of the supporting-members 9 is a clamp 12, and located between said clamp 12 and studs 13 mounted on the hub 3 of the wheel is a spring 14.

Mounted on the respective supporting-members 9, and adapted to move in the rim, we provide a sectional tire 15. This tire, as illustrated and as preferred, is made of hard rubber, and comprises a plurality of spaced sections or members circumferentially disposed in and projecting from the rim or felly to provide tread surfaces for the wheel.

In connection with our invention we show anti-skidding means, said means, however, are not claimed in this application. As illustrated, the anti-skidding means comprise a plate 16 having a series of radially extended arms 17 extending from the hub of the wheel to the rim 5. Plate 16 is mounted on the hub and adapted to turn therewith. Secured to the outer ends of the respective arms 17, we provide a movable member 18, having projecting pins 19, the latter being adapted to extend through openings 8 in the annular flange 7, as particularly shown by Fig. 2.

Movable members 18 are each pivotally secured at one end to an arm 17 by means of a pin 20, and their opposite ends are provided with ears 21 carrying a pin 22. Mounted on an extended portion 3ª of hub 3, we provide a horizontally and bodily movable or shifting member 23 designed to be moved, from the position shown in full lines in Fig. 2 to the position shown in dotted lines, by means of an operating lever 24, and connecting members 25 and 26. The movable member 23 is connected with pin 22 of the respective members 18 by rod 27, and a flexible connection comprising two links 28 and 29 interposed between the outer end of rod 27 and an end of member 18. By means of the construction just described, we are enabled to move said member 23 to throw the members 18 or their projecting members or pins 19 into and out of operative position at will.

In the form of Fig. 4, we have shown the spokes 4ª formed with grooves *b* with the edges of the tire supporting-members entered therein.

What we claim is:

1. In a wheel, the combination of a hub, a series of spokes, a continuous rigid rim mounted on the outer ends of the spokes, said rim U-shaped in cross-section and having a series of slots therein, a series of tire supporting members each located between adjacent spokes and extending through a slot in the rim, coacting guide means, said supporting members each formed with a flange on its outer end disposed within the rim and movable therein, springs interposed between the hub and the supporting members, and a sectional tire located in the rim and resting upon the flanges of the supporting members.

2. In a wheel, the combination of a hub, a series of spokes, a continuous rigid rim mounted on the outer ends of the spokes, said rim U-shaped in cross-section and having a series of slots therein a series of tire supporting members each located between adjacent spokes and extending through a slot in the rim, coacting guide means between the spokes and the supporting members, said supporting members each formed with a flange on its outer end disposed within the rim and movable therein, a spring engaging member on the tire supporting members, springs interposed between the hub and the spring engaging members, and a sectional tire located in the rim and resting upon the flanges of the supporting members.

In testimony whereof we affix our signatures in presence of two witnesses.

CHARLES E. MARTIN.
SAMUEL J. CLOKEY.

Witnesses:
W. G. DOOLITTLE,
F. E. GAITHER.

---

Copies of this patent may be obtained for five cents each, by addressing the "Commissioner of Patents, Washington, D. C."